United States Patent

[11] 3,559,688

| [72] | Inventors | Alvin M. Fischer;<br>Harry J. Warmkessel, Allentown, Pa. |
|---|---|---|
| [21] | Appl. No. | 821,812 |
| [22] | Filed | May 5, 1969<br>Division of Ser. No. 461,394, June 4, 1965,<br>Patent No. 3,442,502. |
| [45] | Patented | Feb. 2, 1971 |
| [73] | Assignee | Mack Trucks, Inc.<br>Allentown, Pa.<br>a corporation of Delaware |

[54] FLUID PRESSURE REGULATING VALVE
3 Claims, 2 Drawing Figs.

[52] U.S. Cl. .................................................. 137/627.5,
267/65
[51] Int. Cl. .................................................. F16k 11/10
[50] Field of Search .................................................. 137/627.5,
116.3, 116.5; 251/63; 267/65

[56] References Cited
UNITED STATES PATENTS

| 3,026,908 | 3/1962 | Blair | 137/627.5 |
| 2,985,490 | 5/1961 | Gates | 137/116.5X |
| 3,107,693 | 10/1963 | Puster | 137/627.5X |
| 3,259,439 | 7/1966 | Bueler I | 137/627.5X |
| 3,394,968 | 7/1968 | Bueler II | 137/627.5X |
| 3,429,621 | 2/1969 | Bueler III | 137/627.5X |
| 3,442,502 | 5/1969 | Fischer | 267/65 |

FOREIGN PATENTS

| 880,977 | 10/1961 | Great Britain | 137/627.5 |
| 959,936 | 4/1950 | France | 137/627.5 |

Primary Examiner—Clarence R. Gordon
Attorney—Brumbaugh, Graves, Donohue & Raymond ABSTRACT: A fluid pressure regulating valve having a control port, an inlet port, an outlet port and an exhaust port, an inlet valve disposed between the inlet and outlet ports, and a reciprocable piston having a hollow stem extending toward and adapted to engage and open the inlet valve in one position and to disengage the inlet valve to close the same in another position, the piston having an exhaust passage extending from the hollow stem to a location adjacent the exhaust port which is closed when the hollow stem engages the inlet valve and which is opened when the stem disengages the inlet valve.

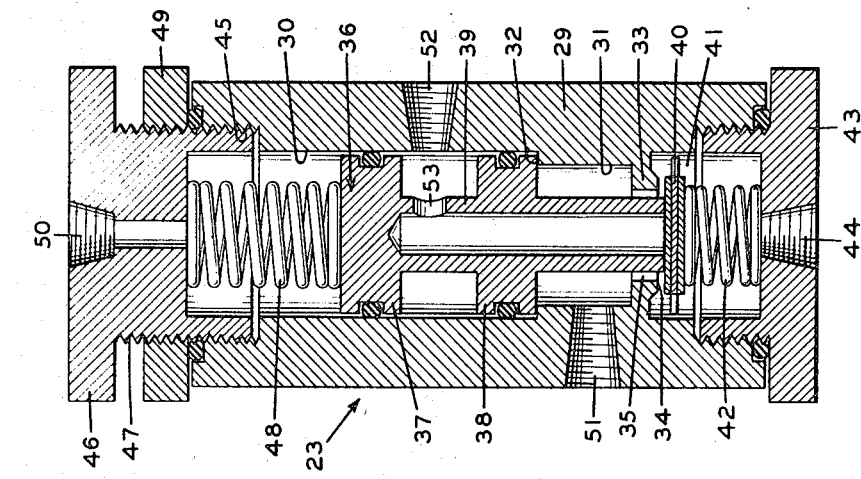
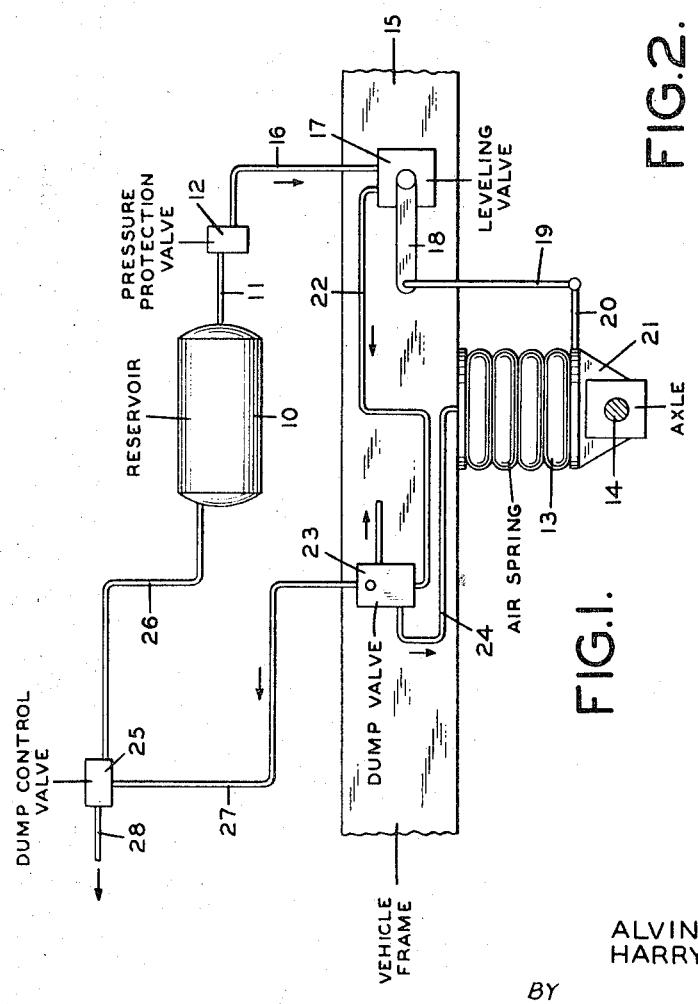

FLUID PRESSURE REGULATING VALVE

This is a division of U.S. Pat. application Ser. No. 461,394, filed June 4, 1965, now Pat. No. 3,442,502.

This invention relates to a fluid pressure regulating valve and, more particularly, to a valve which may be used as a dump and pressure regulating valve in a system for regulating and maintaining pressure in the air spring of an air or air and leaf spring suspension.

Air springs are commonly used alone or in combination with leaf-springs in trailer trucks and other vehicles. Ordinarily, the air springs are pressurized by compressed air from an air reservoir supplied by an engine-driven compressor through a pressure protection valve and a leveling valve which adjusts the pressure in the air springs in response to prolonged load changes and body developments and thereby maintains uniform spacing between the axle and the body or frame of the vehicle.

Inasmuch as leveling valves used in pressurizing and maintaining proper spacing between the axle and the vehicle frame or body are not responsive to momentary changes in spacing caused by road irregularities and the like, under some conditions of operation they can cause damage to shock absorbers, the vehicle and to the air springs themselves. Thus, when a tractor is being uncoupled from a trailer, the landing wheels or front jacks of the trailer are normally lowered while air pressure is maintained in the air springs of the tractor. When the tractor is pulled out from under the trailer or semitrailer, the pressure in the air springs tends to kick or lift the back of the tractor suddenly and violently, sometimes damaging the shock absorbers or even the front of the trailer or the back of the tractor or the air springs.

In accordance with the present invention, an air spring system is provided in which the pressure in the air springs can be unloaded or reduced quickly by the operator of the vehicle before uncoupling and withdrawing the tractor from beneath the trailer.

More particularly, in accordance with the present invention, an operator-controlled dump and pressure regulating valve is interposed between the leveling valve and the air spring or springs to enable the vehicle driver or operator to reduce quickly the pressure in the air springs to a minimum pressure sufficient to avoid damage to the air springs but nevertheless insufficient to cause uncontrolled springing up of the back of the tractor as it is relieved of load. Maintenance of a low predetermined pressure in the air springs when the vehicle is operating without load improves the ride and handling characteristics of the vehicle in addition to protecting the air springs against damage.

For a better understanding of the present invention, reference may be had to the accompanying drawings, in which:

FIG. 1 is a schematic diagrammatic view showing a typical air spring suspension system embodying the present invention; and FIG. 2 is a view in vertical section through the dump and pressure regulating valve included in the new system.

As indicated above, the air spring suspension which is described hereinafter may also be used in combination with a leaf spring suspension on vehicles such as tractors for trailers and semitrailers. The leaf springs are not illustrated in FIG. 1, inasmuch as they are conventional.

In the embodiment of the invention shown in FIG. 1, the system includes a compressed air storage tank or reservoir 10 to which air is supplied by means of a compressor, now shown, which may be driven by the engine of the vehicle. Air is supplied from the reservoir 10 by means of a pipe 11 to a pressure protection valve 12 which maintains a safe predetermined air pressure in reservoir 10 for use by the brake system. Air from the pressure protection valve is supplied by means of a pipe 16 to a conventional leveling valve 17 on the frame 15. The valve 17 is responsive to displacement of the actuating lever 18 thereof by changes in displacement of the frame 15 relative to the axle due to changing loads on the frame. The lever 18 is connected by means of a link 19 to an arm 20 which is attached to the axle or to a spring bolster 21 in any desired way. The discharge pipe 22 from the outlet of the leveling valve 17 is connected to a control and dump valve 23 which, as described hereinafter, controls the supply of air to, or discharge of air from, the air spring 13 through a pipe 24. Control of the dump valve 23 by the operator is achieved by means of a valve 25 in the cab of the vehicle which receives air under pressure from the reservoir 10 or other pressure source through a pipe 26. The valve 25 may also have another function in the system such as serving as a tractor protection control valve used for shutting off the air supplied to the trailer brake hoses prior to disconnecting the hoses from the tractor. In one position of the valve 25, air is vented from the dump valve 23 through a pipe 27 and a vent port. In another operating position of the valve 25, air is supplied under pressure from the reservoir 10 to the dump valve 23 through the pipe 27. The dump valve 23 which is a novel feature of the invention is disclosed more particularly in FIG. 2. It includes a valve casing 29 having a cylindrical bore 30 therein communicating with a bore 31 in the lower end thereof of lesser diameter providing a shoulder 32 at the junction of the bores. Below the bore 31 is a partition 33 having a valve seat 34 on its lower surface and a central valve port 35 therethrough. Disposed within and reciprocally lengthwise of the enlarged bore 30 is a double headed piston valve plug 36 having an upper piston 37, a lower piston 38, and a tubular stem 39 connecting them and extending downwardly below the lower piston 38. In the lowermost position of the plug 36 the stem 39 extends through the aperture and displaces from contact with the seat 34 a valve disc 40 which is disposed in a chamber 41 below the partition 33 and is normally biased against the seat by means of a coil spring 42. The lower end of the chamber 41 is closed by means of a threaded cap 43 which supports the lower end of the spring 42 and has a port 44 therein with which the pipe 22 from the leveling valve is connected. The upper end of the casing 23 includes an internally threaded portion 45 for receiving an adjusting member 46 having an externally threaded sleeve 47 thereon enabling it to be adjusted inwardly and outwardly to vary the extent of compression of a coil spring 48 which bears against the underside of the adjusting member and against upper end of the piston 36. A lock nut 49 may be provided on the threaded sleeve 47 to lock the adjusting member 46 in a desired position. Suitable seals may be provided in the valve at appropriate points for preventing leakage and also maintaining sealing engagement between the pistons 37 and 38 and the wall of the bore 30. A control port 50 is provided in the adjusting member 46 and is connected with the pipe 27 running from the dump control valve 25. Between the partition 33 and the shoulder 32 in the valve is a port 51 to which the pipe 24 leading to the air spring 13 is connected. An exhaust port 52 is formed in the casing 29 between the pistons 37 and 38 of the piston valve plug 36 and communicates with the port 53 in the tubular stem 39.

The position of the valve plug 36 is responsive to the pressure supplied from the dump control valve 25, the pressure of the springs 42 and 48 and the pressure in the air spring 13 at the port 51. Accordingly, when the dump control valve is adjusted to supply air under sufficient pressure through the pipe 27 against the top of the piston 36, this pressure, in combination with the pressure exerted by the spring 48, moves the valve 36 downwardly seating the lower piston 38 against the shoulder 32 and displacing the disc valve 40 from its seat 34. At the same time, the disc valve seals the lower end of the tubular stem 39. With the valve in this condition and as shown in FIG. 2, the pressure in the air spring is directly responsive to the action of the leveling valve 17 which will admit pressure to the air spring or discharge air from the air spring, depending upon the load carried by the vehicle, to maintain a predetermined spacing between the frame and the axle, while nevertheless permitting momentary changes in the spacing due to road irregularities and the like.

If, for any reason, it is desired to relieve the air spring of the pressure supplied by the leveling valve as, for example, when a trailer is to be uncoupled from the vehicle, the driver can actuate the dump control valve 25 to discharge the pressure above the plug 36 through the pipe 27 and the vent 28 in the dump control valve 25 to discharge the pressure above the plug 36 through the pipe 27 and the vent 28 in the dump control valve 25. Accordingly, the only pressure holding the valve plug 36 in its lower position is that of the spring 48 and a lower pressure which may be maintained by the valve 25. Any desired pressure, such as five pounds per square inch air pressure may be applied to the top of the plug 36. The higher pressure in the air spring 13 acting through the pipe 24 and the port 51 against the lower face of the lower piston 38 will displace the valve plug 36 upwardly allowing the disc valve 40 to engage its seat and uncovering the lower open end of the tubular valve stem 39 so that air in the air spring is vented through the vent port 52. When the pressure in the air spring decreases sufficiently, the spring 48 and any maintained air pressure above the plug 36 will force the plug 36 downwardly to close the lower end of the tubular valve stem without, however, displacing the valve disc 40 from its seat so that escape of additional air from the air spring is prevented. By adjusting the pressure applied by the spring 48 to the upper end of the piston 36, a predetermined pressure can be maintained in the air spring 13. If because of leakage or any other reason the air pressure in the air spring 13 decreases still further, the spring 48 and the air pressure above the plug 36 will force the plug 36 downwardly, unseating the valve 40 from its seat 34 and allowing air to be admitted from the leveling valve through the port 44, the opening 35 and the port 51 into the air spring to again establish a balance between the pressure exerted on the top of the piston 37 and the bottom of the piston 38. Inasmuch as the valve 23 can be actuated almost instantaneously to discharge pressure down to a predetermined value in the air spring, all that the operator needs to do before uncoupling a trailer from a tractor is to actuate the dump control valve 25 to partially deflate the air springs, after which the tractor can be withdrawn without springing up as it is relieved of the load of the trailer. By the same token, by leaving the dump control valve in its venting position, a sufficient air pressure is maintained in the air spring 13 to prevent damage to the air spring while the vehicle is operated in an unloaded condition.

It will be understood that a single dump valve and the leveling valve can be provided for both air springs at opposite ends of the axle or that separate leveling valves and dump valves may be provided for each of the air springs of the vehicle. Also, other interconnections are possible in order to stabilize and prevent tilting of the vehicle in accordance with known practice. In addition, it is apparent that the novel pressure regulating valve may be used in other pneumatic systems. Accordingly, inasmuch as the above described system is susceptible to considerable modification in its detail and arrangement, the embodiment of the invention disclosed herein should be considered as illustrative.

We claim:

1. A dump valve for an air spring system comprising: a valve casing defining a cylindrical bore adapted to receive a piston and having a stop in the lower middle portion thereof adapted to limit the travel of such piston and an outlet port in the side thereof below the stop for connection to the air spring and an exhaust port in the side above the stop; threaded caps covering each end of the bore, the top cap having a control port for connection with a dump valve pressure control system and the bottom cap having an inlet port for connection with a leveling valve system; an inlet port for connection with a leveling valve system; an inlet valve disposed in the lower portion of the bore below the stop between the inlet and outlet ports; a double headed piston valve plug reciprocally disposed in the bore above the stop adjacent to the exhaust port between the outlet and control ports, the piston valve plug having an upper piston connected to a lower piston by a tubular stem which extends downwardly toward the valve disc and defines a passage from the lower end of the stem into the central portion of the piston assembly and out the side thereof between the pistons adjacent to the exhaust port and which engages the valve disc to close the exhaust passage and open the inlet valve when the piston valve plug is in the lower portion of the bore and disengages the disc to close the inlet valve and open the exhaust passage when the piston valve plug is in the upper portion of the bore; and an adjustable spring member compressed between the upper cap and the piston and urging the piston downwardly toward the inlet valve.

2. A fluid pressure regulating valve comprising: a valve casing defining a cylindrical bore adapted to receive a piston and having a stop in the lower middle portion thereof adapted to limit the travel of such piston and a pressure outlet port in the side thereof below the stop and an exhaust port in the side above the stop; threaded caps covering each end of the bore, the top cap having a control port and the bottom cap having a pressure inlet port; an inlet valve disposed in the lower portion of the bore below the stop between the inlet and outlet ports and including a valve seat, a valve disc and a spring urging the disc toward the seat to close the bore between the inlet and outlet ports; and a double headed piston valve plug reciprocally disposed in the bore above the stop adjacent to the exhaust port between the outlet and control ports, the piston valve plug having an upper piston connected to a lower piston by a tubular stem which extends downwardly toward the valve disc and defines a passage from the lower end of the stem into the central portion of the piston assembly and out the side thereof between the pistons adjacent to the exhaust port and which engages the valve disc to close the exhaust passage and open the inlet valve when the piston valve plug is in the lower portion of the bore and disengages the disc to close the inlet valve and open the exhaust passage when the piston valve plug is in the upper portion of the bore.

3. The fluid pressure regulating valve according to claim 2, also including a spring urging the piston downwardly toward the inlet valve.

PO-1050
(5/69)

UNITED STATES PATENT OFFICE
CERTIFICATE OF CORRECTION

Patent No. 3,559,688                    Dated Feb. 2, 1971

Inventor(s) Alvin M. Fischer and Harry J. Warmkessel

It is certified that error appears in the above-identified patent and that said Letters Patent are hereby corrected as shown below:

Col. 1, line 65, "now" should read "not";

Col. 2, line 42, "against upper" should read "against the upper";

Col. 3, lines 4, 5 and 6, after "control valve 25" the following should be deleted: "to discharge the pressure above the plug 36 through the pipe 27 and the vent 28 in the dump control valve 25";

Col. 4, lines 10 and 11, after "valve system;" delete "an inl port for connection with a leveling valve system"; and Col. 4, line 12, after "ports" insert --and including a valve seat, a valve disk, and a spring urging the disk toward t seat to close the bore between the inlet and outlet ports Signed and sealed this 13th day of July 1971.

(SEAL)
Attest:

EDWARD M.FLETCHER,JR.
Attesting Officer

WILLIAM E. SCHUYLER,
Commissioner of Pater